(12) United States Patent
Hansen et al.

(10) Patent No.: US 7,549,385 B2
(45) Date of Patent: Jun. 23, 2009

(54) STEPPED BOAT HULL WITH FLAT PAD PORTIONS

(76) Inventors: John F. Hansen, 920 Cathy Ct. SE., Tumwater, WA (US) 98501; Lloyd T. Hansen, 8802 63rd St. Ct. W., University Place, WA (US) 98467

( * ) Notice: Subject to any disclaimer, the term of this patent is extended or adjusted under 35 U.S.C. 154(b) by 0 days.

(21) Appl. No.: 11/840,652

(22) Filed: Aug. 17, 2007

(65) Prior Publication Data

US 2009/0044741 A1 Feb. 19, 2009

(51) Int. Cl.
*B63B 1/32* (2006.01)
*B63B 1/00* (2006.01)
(52) U.S. Cl. .................. 114/291; 114/271
(58) Field of Classification Search ............. 114/291
See application file for complete search history.

(56) References Cited

U.S. PATENT DOCUMENTS

| 2,044,771 | A | * | 6/1936 | Carr, Jr. | |
| 3,661,109 | A | * | 5/1972 | Weiland | |
| 4,027,613 | A | * | 6/1977 | Wollard | 114/291 |
| 4,233,920 | A | * | 11/1980 | Wood et al. | 114/291 |
| 4,619,215 | A | * | 10/1986 | Wood et al. | 114/61.33 |
| 5,140,930 | A | * | 8/1992 | Lund | |
| 5,452,675 | A | * | 9/1995 | Devin | |
| 6,000,357 | A | * | 12/1999 | Allison | |
| 6,260,503 | B1 | * | 7/2001 | Allison | |
| 6,415,731 | B2 | * | 7/2002 | Chrunyk | |
| 6,425,341 | B1 | * | 7/2002 | Devin | |
| 6,925,953 | B1 | * | 8/2005 | Batista et al. | |
| 2001/0047747 | A1 | * | 12/2001 | Allison | |
| 2005/0016435 | A1 | * | 1/2005 | Robinson et al. | |

* cited by examiner

*Primary Examiner*—Jesus D Sotelo
(74) *Attorney, Agent, or Firm*—Clark A. Puntigam; Jensen & Puntigam, P.S.

(57) ABSTRACT

The boat hull includes a bow, a stern and a bottom surface which extends from the bow to the stern. The hull includes a bottom surface with a deep-V shaped portion extending from the bow to a hull point which is aft of the mid-point of the bottom surface, approximately two-thirds thereof. At least two steps, referred to as flat steps, are included in the bottom surface of the boat, between the hull point and the stern. The steps extend across a portion of the bottom surface. Flat pads extend from each step to the next step or to the rear of the stern. A decrease in the size of the entire hull, referred to as a hull step, occurs at the second or third step in the bottom surface of the boat.

17 Claims, 6 Drawing Sheets

STEPPED BOAT HULL WITH FLAT PAD PORTIONS

TECHNICAL FIELD

This invention relates generally to boat hull designs, and more specifically concerns boat hulls with a plurality of steps along the length of the hull.

BACKGROUND OF THE INVENTION

Deep-V hull configurations are generally well known and have become increasingly popular because of several advantages, including riding and handling characteristics. There are, however, some known disadvantages with such a design, relative to the mounting of either inboard or outboard drives, with resulting drag, as well as drag due to the deep-V design itself due to the friction from water flow along the hull. Drag lowers the efficiency of the boat and reduces speed or requires more power to reach desired speeds. Further, as the dead rise of the deep-V increases, providing a softer ride, so does the drag. More power is required to overcome the increased drag as well as the accompanying reduced lift. Attempts to reduce drag, such as by the use of separate tunnels through the hull, have met with only limited success. A single step in a deep-V hull near the rear of the hull has been used in an attempt to increase performance, as shown in U.S. Pat. No. 4,027,613, but this arrangement produces less than optimal performance.

With outboard-driven boats, it is usually desirable to have the outboard drive mounted high relative to the boat in order to reduce drag. One approach with a high mounted outboard engine includes the use of a cleaver-type propeller, which breaks the surface of the water in order to reduce the drag. However, a cleaver propeller is designed for high performance applications, is more expensive than a conventional propeller, and has the disadvantage of tending to keep the bow down, in order to prevent blow-over. It is preferable that the bow of the deep-V hull boat be raised somewhat when the boat is under power to provide better control in varying sea conditions and to provide maximum lift for the boat with the least possible drag.

It is thus desirable to have a deep-V bull with its conventional good handling and ride characteristics, but configured to reduce drag, increase lift and adapted to accommodate both inboard and outboard drives with improved efficiency.

DISCLOSURE OF THE INVENTION

Accordingly, the present hull portion arrangement for a boat comprises: a bow, a stern portion and a bottom surface extending from said bow to said stern, said bottom surface including a deep-V shaped portion extending from the bow to a hull point aft of the mid-point of the bottom surface, and further including at least two steps in the bottom surface between said hull point and said stern, the steps extending across a selected portion of the hull, and flat portions associated therewith having approximately the same width as the step extending from each step to the next step or to the stern.

BEST MODE FOR CARRYING OUT THE INVENTION

Figure 1:
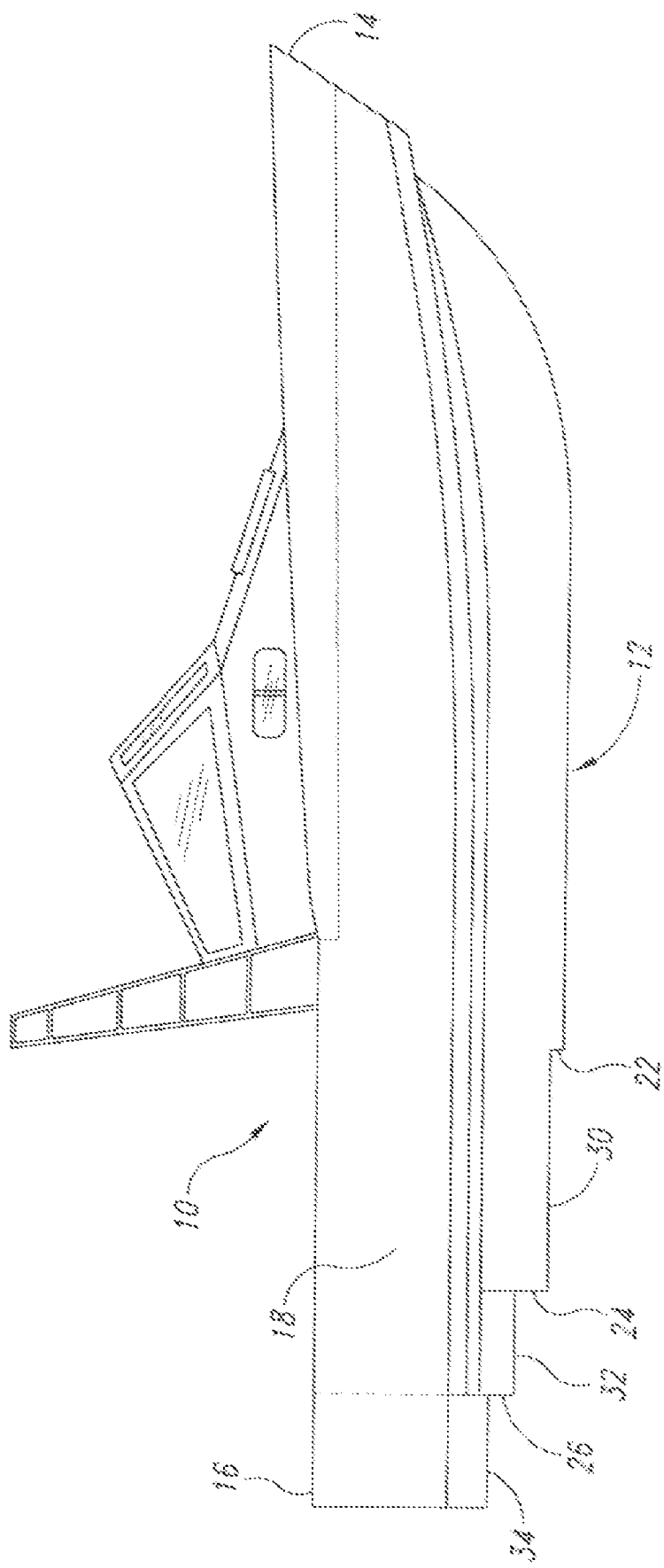
FIG. 1 is an elevational view of an inboard drive boat with a deep-V hull with steps and associated flat pads.
Figure 2:
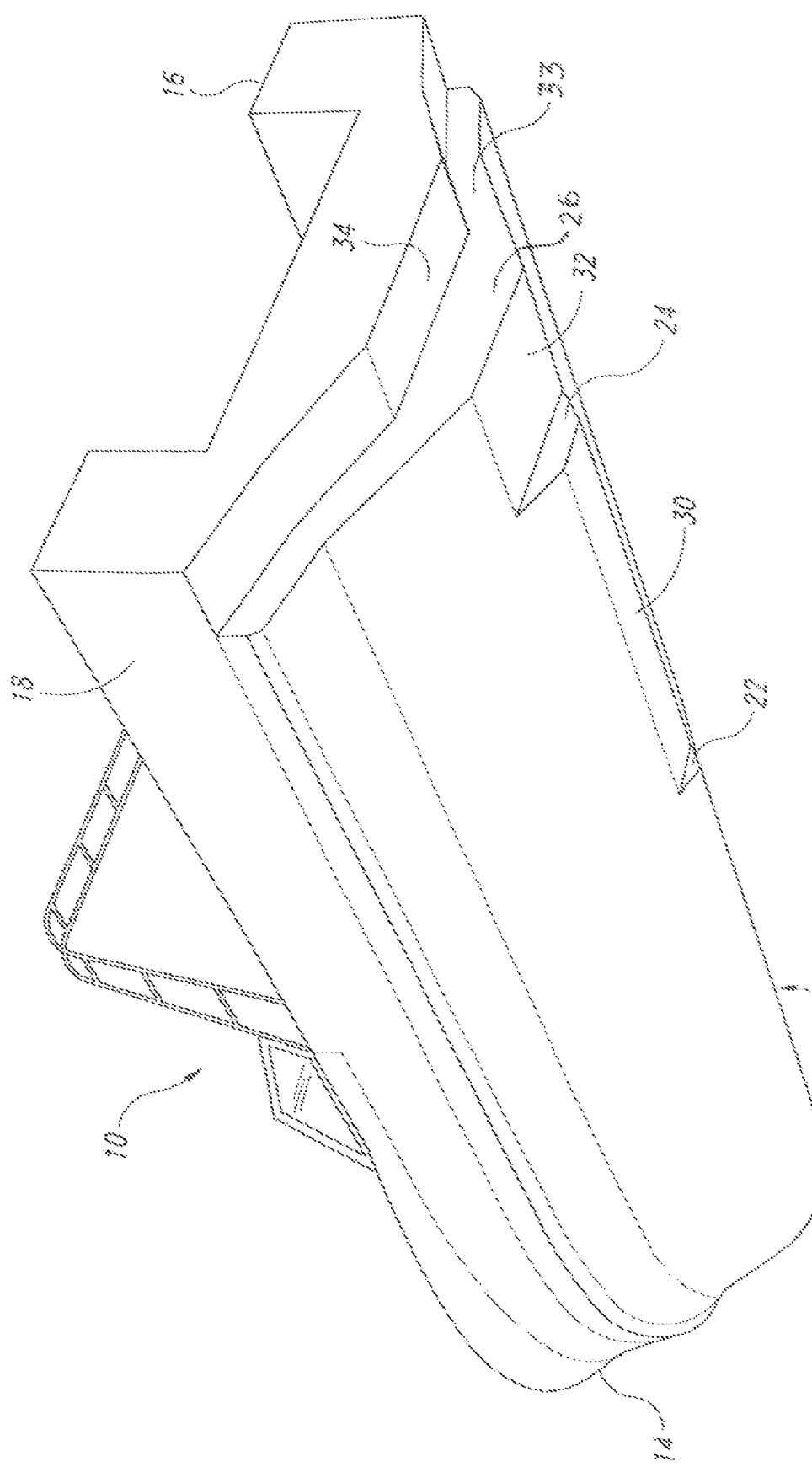
FIG. 2 is a bottom view of the configuration of FIG. 1.

FIGS. 1 and 2 show a first configuration of an inboard drive sport boat with a deep-V hull, shown generally at 10. The deep-V hull 12 of boat 10 has a particular configuration designed to improve overall performance, including a plurality of steps, referred to also as flat steps, and associated flat pads in the bottom surface of the hull. Sport boat 10 as shown is approximately 21 feet long in the embodiment shown, although the length and overall dimensions of the boat can vary significantly. Boat 10 includes a bow 14, a stern 16 and side portions 18. As indicated above, the hull is a deep-V design typically having a dead rise within the range of 15°-30°. The deep-V hull 12 shown, with a plurality of steps and associated flat pads, exhibits improved performance, in particular an increase in speed for a given amount of power, without affecting the handling characteristics.

In the range of 15°-30° dead rise, the steps will have a width-to-length ratio of 3:1-12:1. In a narrower dead rise range of 20°-25°, which is more typical, the ratio range is 4:1-7:1. For the broad dead rise range the height of the first step is between 1-4 inches at its highest point, the height of the second step is between 1-6 inches, and the height of the third step, if there is one, is between 1-10 inches. For the narrow range of 20°-25° dead rise, the three steps are 2-3 inches at the highest point, 2-6 inches and 4-8 inches, respectively. The specific embodiment of FIGS. 1 and 2 includes three steps 22, 24 and 26 in the bottom of the hull. Step 22 is located approximately 14 feet from the bow of the 21-foot boat, i.e. approximately two-thirds of the length of the boat from the bow. In this embodiment, step 22 is 2 inches high at its maximum (highest point, from the low point of the V) and approximately 10-11 inches wide at the upper edge of the step. The step is formed in the hull extending at a right angle (approximately 90°) from the bottom of the hull. A flat pad 30, which is a simple flat surface in the bottom of the hull, extends from step 22 back to the next step 24. Flat pad 30 is approximately 10-11 inches wide along the entire length thereof (the same width as the step), and is approximately parallel to the bottom surface of the hull. In the embodiment shown, flat pad 30 is between 3 and 6 feet long.

Second step 24 in the embodiment shown is within the range of 5-6 inches high at its maximum and also extends approximately 90° from the bottom surface of the boat. The second step is approximately 35 inches wide at the upper edge of the step. Associated flat pad 32 extends towards the rear of the hull from step 24 for a distance of 18-24 inches.

Flat pad 32 terminates at third step 26, which in the embodiment shown is approximately 8 inches high at its maximum and 55 inches wide at the top of the step. Associated flat pad 34 extends from step 26 to the rear end of the stern platform 16. The length of flat pad 34 will vary depending upon the length of flat pads 30 and 32 and the location of first step 22 relative to the overall length of the boat, but is generally 18-24 inches in length.

Although the three steps are generally at approximately 90° to the bottom of the hull, they could be angled as well.

Positioned at or prior to the third step in the embodiment shown is a hull step 33, 1-4 inches high, shown in FIG. 2, which decreases the size of the entire hull of the boat at that point. This decrease in the hull dimension will accordingly result in a decrease in the width of the flat pad from the third step. The hull step 33 will typically be at the last or rearmost flat step 26, although it is possible to have the hull step at an intermediate flat step, such as at the second flat step in a three-step arrangement. The use of a hull step in an inboard drive boat is significant in improving performance.

As discussed above, the plurality of flat steps and their associated flat pads can be used on inboard drive deep-V hull boats having a variety of sizes, configurations and dead rise angles. The arrangement has several advantages. The plurality of steps and associated flat pads result in a "breaking" of the water away from the hull to reduce the frictional drag on the boat, and thereby increase top speed for a given amount of power. The use of a flat pad behind each step further reduces the drag on the boat, increases performance and provides substantially more lift when accelerating to plane the boat and to maintain a planing attitude.

With an inboard arrangement, multiple flat steps with associated flat pads, in the particular arrangement and dimensions shown, with an inboard engine mounted over the center of gravity in the hull, permit the propeller shaft to extend out the back of the hull with a zero or approximately zero deflection/angle, such that the propeller shaft extends parallel to the bottom of the hull. Also, and quite importantly, with such an arrangement, the bottom edge of the propeller is positioned at or above the bottom of the hull. In some cases, it could be slightly below the bottom of the boat, i.e. 5-6 inches or less. This arrangement increases the efficiency of the propeller action and reduces the overall draft of the boat. This has advantages not only in increased speed but also for shallow water operation and for trailer launch and retrieval. Hence, the above arrangement of multiple steps and associated flat pads has several advantages over existing hull configurations.

Figure 3:
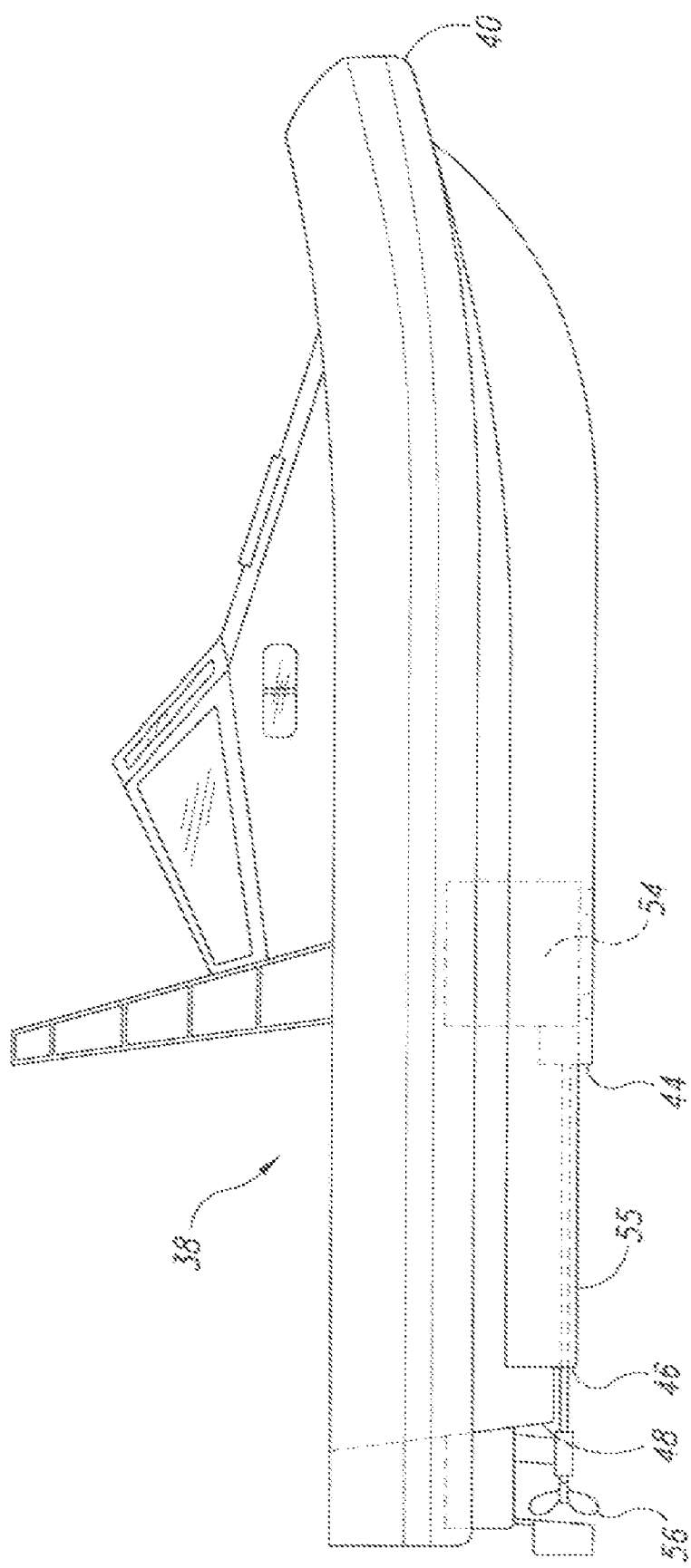
FIG. 3 is an elevational view of an alternative embodiment of the boat hull of FIG. 1.
Figure 4:
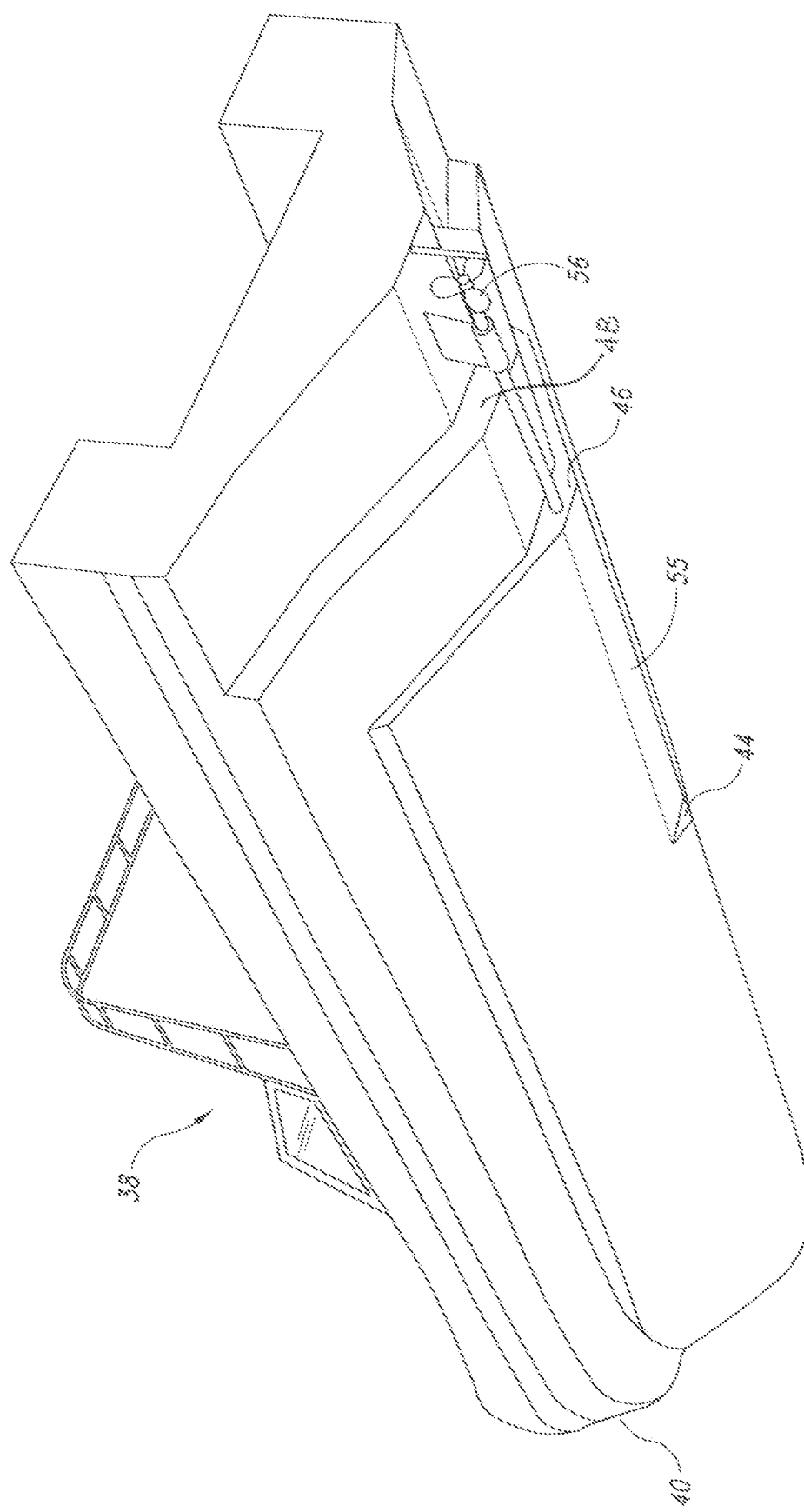
FIG. 4 is a bottom view of the configuration of FIG. 3.

FIGS. 1 and 2 show a particular step-flat pad hull arrangement utilizing three separate steps and associated flat pads of particular dimensions. An alternative configuration is shown in FIGS. 3 and 4. FIGS. 3 and 4 show another particular hull configuration also using three steps with three associated flat pads. It should be understood, however, that two steps and associated flat pads can be used, as well as more than three steps.

The arrangement of FIGS. 3 and 4 includes a first step which is also located at a point approximately two-thirds of the length of boat 38 from the bow 40. In this configuration, a first step 44 is approximately two inches high at its highest point, a second step 46 is approximately three inches, and a third step 48 is 6-8 inches. The third step occurs approximately at the transom of the boat. With a 25° dead rise, each step has an associated flat pad with a width that is approximately 4.5-7 times the height of the step (and equal to the width of the step), extending back to the next step or in the case of the third step, to the stern end of the boat. The third step 48 is shown as being angled away from 90° in FIG. 3. It could be approximately 90° as well. The length of the individual flat pads in FIGS. 3 and 4 can be varied, depending on the boat. This embodiment will also typically have a hull step of 1-4 inches, preferable 2 inches, before the second or third step, preferably at the third step.

The arrangement of the three flat steps and the flat pads, as discussed above, results in a reduction of the drag on the boat by breaking the water away from the hull, reducing/eliminating areas of low pressure and friction, as well as providing additional lift for the boat, assisting the boat to plane, and thereby increasing speed and performance for a given amount of power. The height of the individual steps can be fairly large, because engine 54 is over the center of gravity of the boat, so that the fore and aft stability of the boat is not affected by the aggressive (large) size steps. The particular arrangement of the multiple steps and flat pads permit the desirable results of a deep-V configuration with a zero deflection propeller shaft 55 extending out from the second step, and a propeller 56 position which is at or above or slightly below the bottom of the deep-V shaped portion of the hull.

Figure 5:
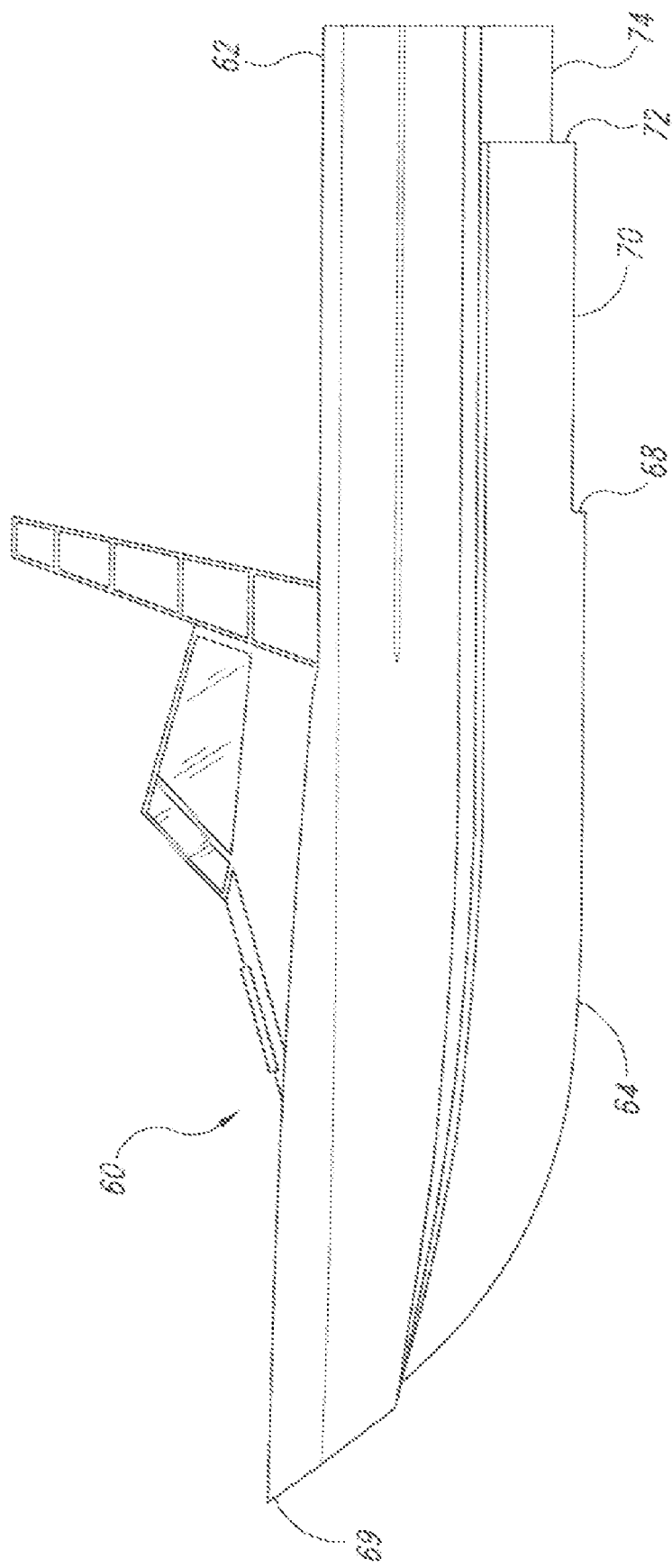
FIG. 5 is an elevational view of an outboard drive boat with a deep-V with steps and associated flat pads.
Figure 6:
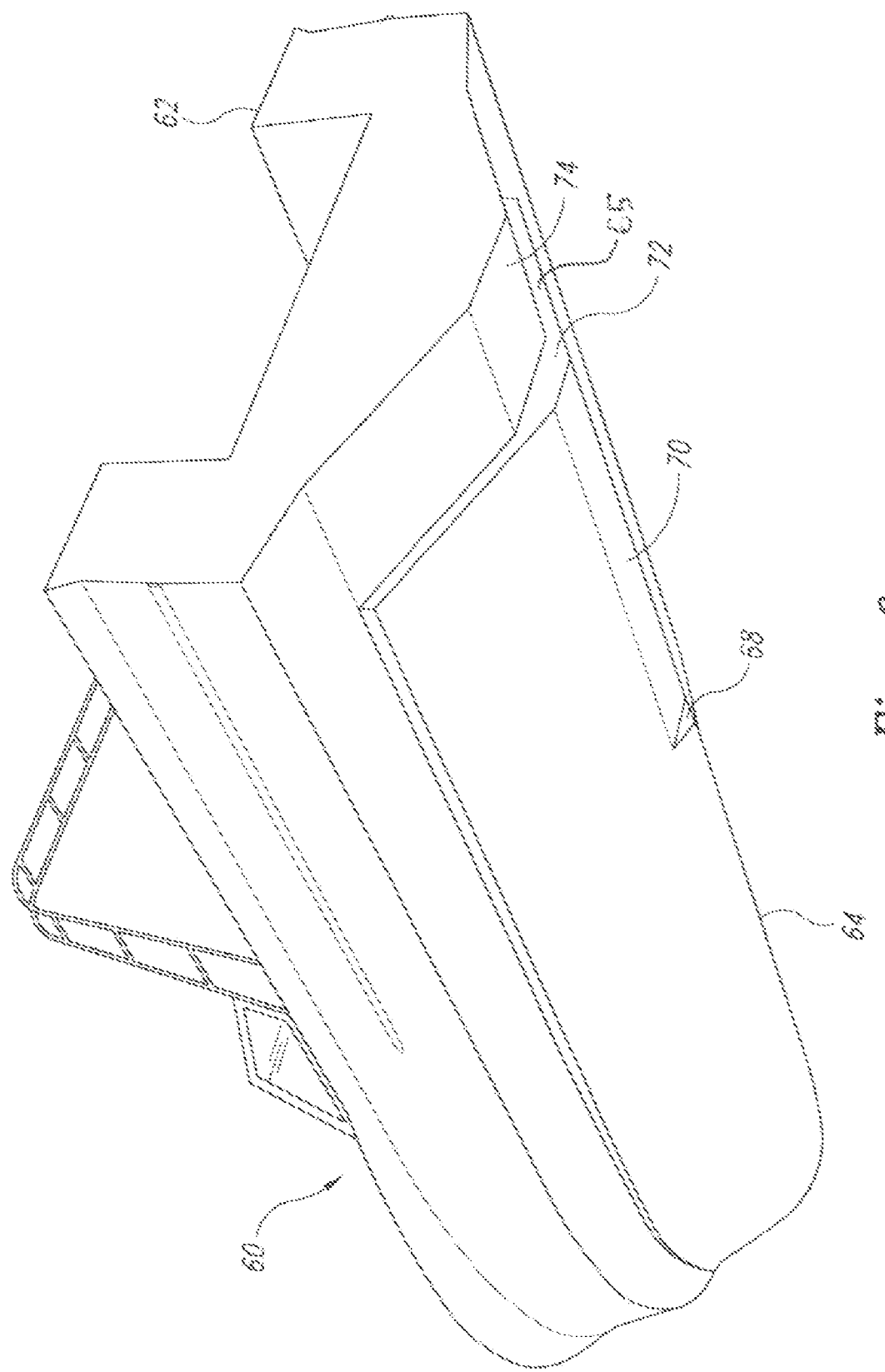
FIG. 6 is a bottom view of the hull configuration of FIG. 5.

FIGS. 5 and 6 show a boat 60 for use with outboard motors mounted on stern platform 62. This embodiment also has a deep-V hull 64, which includes a plurality of flat steps and associated flat pads in the bottom of the hull 64, as well as a hull step 65. While the embodiment of FIGS. 5 and 6 shows two steps and associated flat pads, it should be understood that three or more steps and associated flat pads can be used. In a specific embodiment, hull 64 includes a first step 68, which in the embodiment shown is two inches high and is positioned at a point approximately two-thirds the length of the boat back from bow 69 and extends approximately 90° from the bottom of the hull. In this embodiment, the step is approximately 10-11 inches wide. An associated flat pad 70, also 10-11 inches wide, extends rearwardly from step 68 to second step 72.

The hull step 65, at the second step, will be 1-4 inches high, typically approximately 2 inches and results in a reduction of that amount of the size of the entire hull of the boat.

Step 72 in the embodiment shown is approximately four inches high and approximately 18 inches wide. Associated flat pad 74 extends rearwardly from step 72, which is located typically at the transom of the boat, to the rear end of stern platform 62. In a variation of the embodiment of FIGS. 5 and 6, the second step can be made higher, i.e. six inches, for example. The step and flat pad arrangement for the outboard drive has many of the same advantages of the inboard drive arrangement; in particular, it reduces drag by breaking water away from the hull. With heavy outboard engines, and with some loss of buoyancy at the rear end of the boat created by the steps, the less aggressive four-inch second step may be preferred in some cases. It is an advantage to have the outboard motor mounted high to reduce drag and to maintain a high transom for safety reasons. The arrangement with the steps and flat pads permits the use of a conventional outboard propeller running near the surface of the water, which increases the efficiency of the boat. A surface-piercing cleaver-type propeller is not necessary. The propeller can be a conventional raked blade design, such as a chopper-type propeller. The chopper-type propeller also tends to pitch the bow of the boat up, providing performance enhancement in conjunction with reduced drag from the multiplicity of steps and flat pads. The hull step is significant in increasing performance and reducing drag with outboard drive boats, particularly in increasing speed.

Accordingly, a new configuration for deep-V shaped hulls has been disclosed using a plurality of steps and associated flat pads, with particular dimensions. This configuration includes at least two steps and associated flat pads, but could include more than two and preferably three in many situations. A hull step may also be included so as to reduce the potential width of the flat steps and further increase performance. This arrangement breaks away the water from the hull to reduce drag, provides additional lift of the stern for assisting in planing of the boat, and maintaining planing with less power. The reduction in drag results in a deep-V shaped hull which has the desired handling characteristics and rough water performance of a conventional deep-V hull, with an increase in speed by as much as 5-6 miles per hour over a conventional deep-V hull and an assist in planing while maintaining enhanced ride and handling on the remaining V portion of the hull.

Although a preferred embodiment of the invention has been disclosed for purposes of illustration, it should be understood that various changes, modifications and substitutions may be incorporated in the embodiment without departing from the spirit of the invention which is defined by the claims which follow.

What is claimed is:

1. In a boat, the hull portion thereof, comprising:
a bow, a stern portion and a bottom surface extending from said bow to said stern, said bottom surface including a deep V-shaped portion extending from the bow to a hull point aft of the mid-point of the bottom surface, and further including at least two steps in the bottom surface between said hull point and said stern, the steps each having a height and a width extending across a selected portion of the hull, and flat pads associated therewith having approximately the same width as their associated step, extending lengthwise from each step to the next step or to the stern, wherein the flat pad associated with a first step has a length which is substantially greater than the height of the first step and is flat from side to side, and wherein each step extends at an angle of approximately 90° relative to its associated flat pad.

2. The hull of claim 1, including a decrease in the size of the entire hull at or prior to a step aft of the first step and associated flat pad.

3. The hull of claim 2, wherein the decrease in hull size occurs approximately at the rearmost step.

4. The hull of claim 2, including at least three separate steps and associated flat pads.

5. The hull of claim 4, wherein the three steps and associated flat pads have dimensions which permit the use of a substantially zero deflection angle propeller shaft for an inboard drive and wherein the propeller on the propeller shaft is positioned at, slightly below or above the bottom of the boat.

6. The hull of claim 5, wherein the propeller is positioned above the bottom of the boat.

7. The hull of claim 5, wherein the first step is approximately two inches high and its associated flat pad is between 3-6 feet long, wherein the second step is approximately 5-6 inches high and its associated flat pad is 18-24 inches long, and wherein the third step is approximately 8 inches high and its associated flat pad is approximately 18-24 inches long, extending to the end of the stern.

8. The hull of claim 7, wherein the width of the first flat pad is approximately 10-11 inches, wherein the width of the second flat pad is approximately 35 inches, and wherein the width of the third flat pad is approximately 55 inches.

9. The hull of claim 5, wherein the first step is approximately two inches high, the second step is approximately three inches high and the third step is approximately 6-8 inches high, and wherein the associated flat pads extend between the successive steps or to the rear of the stern.

10. The hull configuration of claim 1, wherein the first flat pad has a length which is at least five times the height of the first step.

11. The hull configuration of claim 10, including a second flat pad having a length which is at least three times the height of an associated second step and a third flat pad having a length which is at least twice the height of an associated third step.

12. The hull configuration of claim 1, wherein the first step is approximately two inches high at its highest point and the first flat pad has a length in the range of 3-6 feet.

13. In a boat, a hull configuration, comprising:
a bow, a stern, a stern platform configured and arranged for mounting outboard drives thereon and a bottom surface extending from the bow to the stern platform, said bottom surface including a deep V-shaped portion from the bow to a hull point which is aft of the mid-point of the bottom surface, including at least two steps in the bottom surface between said hull point and said stern platform, the steps each having a height and a width extending across the bottom surface, and flat pads extending lengthwise from each step to the next step or to the stern transom, wherein the flat pad associated with a first step has a length which is substantially greater than the height of the first step and is flat from side to side, and wherein each step extends at an angle of approximately 90° relative to its associated flat pad.

14. The hull of claim 13, including a decrease in the size of the entire hull at or prior to a step aft of the first step and associated flat pad.

15. The hull configuration of claim 14, wherein the steps and flat pads and the stern platform are arranged so that the outboard drive may be positioned sufficiently high that a non-cleaver type propeller on the outboard drive turns beneath but comes near the surface of the water but does not break the surface of the water, thereby providing additional lift for the bow of the boat.

16. The hull configuration of claim 14, wherein a first step is approximately two inches high and a second step is approximately four inches high.

17. The hull configuration of claim 14, wherein a first step is approximately two inches high and a second step is approximately six inches high.

* * * * *